United States Patent
Maruoka (10) Patent No.: US 10,589,572 B2
(45) Date of Patent: Mar. 17, 2020

(54) PNEUMATIC TIRE (71) Applicant: SUMITOMO RUBBER INDUSTRIES, LTD., Kobe-shi (JP)

(72) Inventor: Kiyoto Maruoka, Kobe (JP)

(73) Assignee: SUMITOMO RUBBER INDUSTRIES, LTD., Kobe-shi (JP)

(*) Notice: Subject to any disclaimer, the term of this patent is extended or adjusted under 35 U.S.C. 154(b) by 347 days.

(21) Appl. No.: 15/362,899

(22) Filed: Nov. 29, 2016

(65) Prior Publication Data
US 2017/0197470 A1 Jul. 13, 2017

(30) Foreign Application Priority Data

Jan. 13, 2016 (JP) ................. 2016-003999

(51) Int. Cl.
B60C 9/20 (2006.01)
B60C 11/00 (2006.01)
(Continued)

(52) U.S. Cl.
CPC ............ B60C 9/20 (2013.01); B29D 30/0601 (2013.01); B29D 30/08 (2013.01); B60C 9/2009 (2013.01);
(Continued)

(58) Field of Classification Search
CPC ....... B60C 9/20; B60C 9/2006; B60C 9/2009; B60C 11/0083; B60C 2009/2012;
(Continued)

(56) References Cited

U.S. PATENT DOCUMENTS 3,658,999 A * 4/1972 Tangorra ................ B29D 30/38
156/133
4,928,742 A * 5/1990 Oku ..................... B29D 30/242
152/534
(Continued)

FOREIGN PATENT DOCUMENTS

JP 62152902 A * 7/1987
JP 1-101203 A 4/1989
(Continued)

OTHER PUBLICATIONS

Teruhisa Ogata, JP-2006341633 machine translation (Year: 2006).*
(Continued)

Primary Examiner — Robert C Dye
Assistant Examiner — Sedef E Paquette
(74) Attorney, Agent, or Firm — Oblon, McClelland, Maier & Neustadt, L.L.P.

(57) ABSTRACT

A pneumatic tire includes a tread, a carcass and a belt. The belt includes inner and outer layers including steel cords and topping rubbers such that the cords in each layer are parallel-aligned and inclined with respect to equatorial plane and inclination directions of the cords in the layers are opposite to each other with respect to the plane, inclination angle $\alpha s$ of the cords in the inner layer at edge is larger than inclination angle $\alpha c$ at the plane, the edge of the inner layer is at position of 0.9 times axial direction width, inclination angle $\beta s$ of the cords in the outer layer at edge is larger than inclination angle $\beta c$ o at the plane, the edge of the outer layer is at position of 0.9 times axial direction width, and difference between the angles $\alpha s$ and $\alpha c$ is larger than difference between the angles $\beta s$ and $\beta c$.

20 Claims, 3 Drawing Sheets (51) Int. Cl.
  *B29D 30/06* (2006.01)
  *B29D 30/08* (2006.01)
(52) U.S. Cl.
  CPC .. *B60C 11/0083* (2013.01); *B60C 2009/2016* (2013.01); *B60C 2009/2025* (2013.01); *B60C 2011/0033* (2013.01)
(58) Field of Classification Search
  CPC .... B60C 2009/2016; B60C 2009/2025; B60C 2011/0033; B29D 30/0601; B29D 30/08
  USPC ..................................................... 152/209.1
  See application file for complete search history.

(56) References Cited

U.S. PATENT DOCUMENTS

2010/0084068 A1* 4/2010 Kashihara ................. B60C 9/20
                                                          152/526
2010/0263781 A1* 10/2010 Yamaguchi ............... B60C 9/08
                                                          152/556
2014/0138002 A1* 5/2014 Katayama ........... B60C 15/0036
                                                          152/454

FOREIGN PATENT DOCUMENTS

| | | | |
|---|---|---|---|
| JP | 07309104 A | * | 11/1995 |
| JP | 10-147110 A | | 6/1998 |
| JP | 2000-309205 A | | 11/2000 |
| JP | 2006341633 A | * | 12/2006 |
| JP | 2013-052756 A | | 3/2013 |

OTHER PUBLICATIONS

Yuji Goto, JP 62152902, machine translation. (Year: 1987).*
Yoshihide Kono, JP-07309104-A, machine translation. (Year: 1995).*

* cited by examiner

PNEUMATIC TIRE

CROSS-REFERENCE TO RELATED APPLICATIONS

The present application is based upon and claims the benefit of priority to Japanese Patent Application No. 2016-003999, filed Jan. 13, 2016, the entire contents of which are incorporated herein by reference.

BACKGROUND OF THE INVENTION

Field of the Invention
The present invention relates to a pneumatic tire.
Description of Background Art
Japanese Patent Laid-Open Publication No. 2000-309205 describes a tire in which an inclination angle of carcass cords is set to a predetermined angle, and a surface shape of a tread par is formed to be approximately linear in a predetermined range. Japanese Patent Laid-Open Publication No. 2013-52756, Japanese Patent Laid-Open Publication No. H10-147110 and Japanese Patent Laid-Open Publication No. H1-101203 describe tires in which inclination angles of belt cords in a center region and in shoulder regions of a tread are different from each other. The entire contents of these publications are incorporated herein by reference.

SUMMARY OF THE INVENTION

According to one aspect of the present invention, a pneumatic tire includes a tread having an outer surface forming a tread surface, a carcass positioned on an inner side of the tread, and a belt laminated between the tread and the carcass in a radial direction. The belt includes an inner layer including steel cords and a topping rubber, and an outer layer laminated on a radial direction outer side of the inner layer and including steel cords and a topping rubber such that the steel cords in each of the inner and outer layers are parallel-aligned and extending inclined with respect to an equatorial plane and that an inclination direction of the steel cords in the inner layer and an inclination direction of the steel cords in the outer layer are opposite to each other with respect to the equatorial plane, and the belt is formed such that an inclination angle $\alpha s$ of the steel cords in the inner layer at an edge portion of the inner layer is larger than an inclination angle $\alpha c$ of the steel cords in the inner layer at the equatorial plane, that the edge portion of the inner layer is at a position of 0.9 times an axial direction width of the inner layer, that an inclination angle $\beta s$ of the steel cords in the outer layer at an edge portion of the outer layer is larger than an inclination angle $\beta c$ of the steel cords in the outer layer at the equatorial plane, that the edge portion of the outer layer is at a position of 0.9 times an axial direction width of the outer layer, and that a difference between the inclination angle $\alpha s$ and the inclination angle $\alpha c$ is larger than a difference between the inclination angle $\beta s$ and the inclination angle $\beta c$.

According to another aspect of the present invention, a method for manufacturing a pneumatic tire includes molding a raw tire including a tread member that forms a tread, a carcass member that forms a carcass, and a belt member that forms a belt, and vulcanizing the raw tire inside a mold. The molding includes laminating the belt member between the tread member and the carcass member in the radial direction, and the belt member includes an inner layer member that forms an inner layer and an outer layer member that is superimposed on the inner layer member on a radial direction outer side, each of the inner layer member and the outer layer member includes steel cords and an unvulcanized topping rubber such that the steel cords in each of the inner layer and outer layer members are parallel-aligned extending inclined with respect to an equatorial plane, the belt member is formed such that an inclination direction of the steel cords in the inner layer member and an inclination direction of the steel cords in the outer layer member are opposite to each other with respect to the equatorial plane, that an inclination angle of the steel cords in the outer layer member at an edge portion at a position of 0.9 times an axial direction width of the outer layer member is larger than an inclination angle of the steel cords in the outer layer member at the equatorial plane, that an inclination angle of the steel cords in the inner layer member at an edge portion at a position of 0.9 times an axial direction width of the inner layer member is larger than an inclination angle of the steel cords in the inner layer member at the equatorial plane, and that the inclination angle of the steel cords at the edge portion of the inner layer member is larger than an inclination angle of the steel cords at the edge portion of the outer layer member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
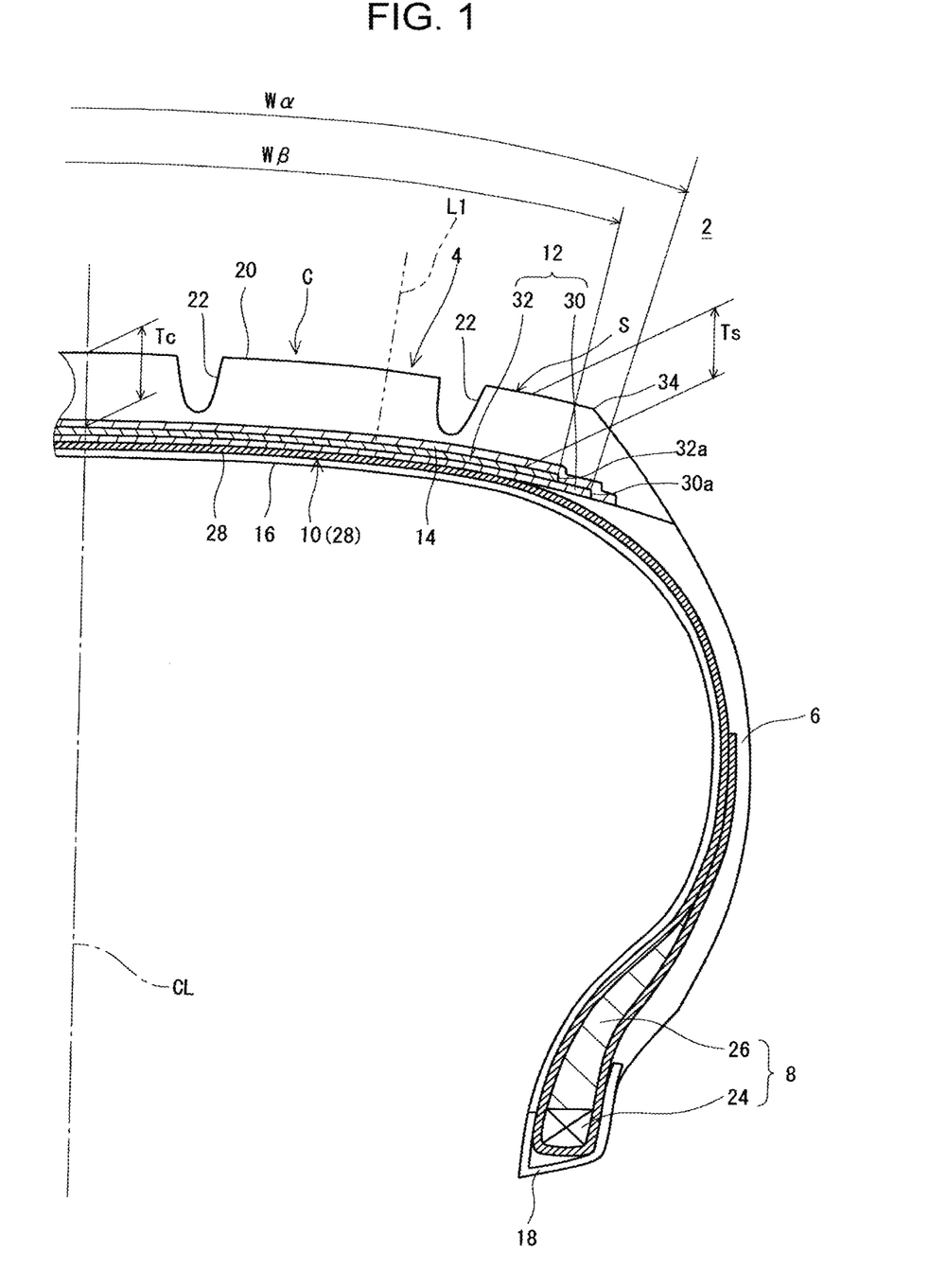
FIG. 1 is a conceptual diagram in which a cross section of a portion of a pneumatic tire according to an embodiment of the present invention is illustrated.

In FIG. 1, an up-down direction of a tire 2 is a radial direction; a left-right direction is an axial direction; and a direction perpendicular to a paper surface is a circumferential direction. The tire 2 has a shape that is substantially left-right symmetric about an one-dot chain line (CL) in FIG. 1. The one-dot chain line (CL) denotes an equatorial plane of the tire 2.

The tire 2 has a tread 4, a side wall 6, a bead 8, a carcass 10, a belt 12, a band 14, an inner liner 16 and a chafer 18. The tire 2 is of a tubeless type. The tire 2, for example, is to be mounted on a passenger car.

The tread 4 is formed of a crosslinked rubber that is excellent in wear resistance. The tread 4 has a shape that is convex outward in the radial direction. The tread 4 has a tread surface 20. The tread surface 20 defines an outer diameter of the tire. The outer diameter of the tire 2 is largest on the equatorial plane. The tread surface 20 is in contact with a road surface. A groove 22 is engraved on the tread surface 20. Although not illustrated in the drawings, the groove 22 includes a main groove that extends around the tread surface 20 in the circumferential direction. A tread pattern is formed by the groove 22.

A two-dot chain line (L1) is an imaginary straight line extending perpendicular to the tread surface 20. The straight line (L1) indicates a boundary between a center region (C) and a shoulder region (S). The tread 4 includes a center region (C) that is positioned at an axial direction center and a pair of shoulder regions (S) that are respectively positioned on axial direction outer sides of the center region (C). In the tire 2, the groove 22 is formed in the center region (C) and the shoulder regions (S). An axial direction width of the center region (C), for example, is 0.4 or more times and 0.8 or less times a tread width. The tread width is a distance from a tread edge 34 on one side in the axial direction to a tread edge 34 on the other side in the axial direction, and is measured along the tread surface 20.

The side wall 6 extends from an edge of the tread 4 substantially inward in the radial direction. The side wall 6 is formed of a crosslinked rubber. The side wall 6 absorbs an impact from a road surface by bending. Further, the side wall 6 prevents the carcass 10 from being externally damaged.

The bead 8 is positioned substantially on a more inner side in the radial direction than the side wall 6. The bead 8 includes a core 24 and an apex 26 that extends from the core 24 outward in the radial direction. The core 24 is ring-shaped. The core 24 is formed by winding a non-stretchable wire in the circumferential direction. Typically, a steel wire is used for the core 24. The apex 26 is tapered outward in the radial direction. The apex 26 is formed of a high-hardness crosslinked rubber.

The carcass 10 includes a carcass ply 28. The carcass ply 28 extends between the beads 8 on both sides along inner sides of the tread 4 and the side walls 6. The carcass ply 28 is folded back around the core 24 from an inner side toward an outer side in the axial direction. The carcass 10 forms a skeleton of the tire 2.

Although not illustrated in the drawings, the carcass ply 28 is formed of a large number of parallel-aligned cords and a topping rubber. An absolute value of an angle formed by each of the cords with respect to the equatorial plane ranges from 70 degrees to 90 degrees. In other words, the carcass 10 has a radial structure. The cords are formed of organic fibers. In the tire 2, the cords are formed of polyethylene naphthalate fibers. Other examples of preferred organic fibers include polyester fibers, nylon fibers, rayon fibers and aramid fibers. The radial structure is exemplary. A carcass of a bias structure may also be adopted.

The belt 12 is positioned on a radial direction outer side of the carcass 10. The belt 12 is laminated on the carcass 10. The belt 12 reinforces the carcass 10. The belt 12 includes an inner layer 30 and an outer layer 32. The inner layer 30 extends from an axial direction edge (30a) on one side in the axial direction to an axial direction edge (30a) (not illustrated in the drawings) on the other side in the axial direction. The axial direction edges (30a) are respectively positioned near the tread edges 34 in the axial direction. The outer layer 32 is positioned on a radial direction outer side of the inner layer 30. The outer layer 32 extends from an axial direction edge (32a) on one side in the axial direction to an axial direction edge (32a) (not illustrated in the drawings) on the other side in the axial direction. The axial direction edges (32a) are respectively positioned near the tread edges 34 in the axial direction.

A double-headed arrow (Wα) indicates an axial direction width of the inner layer 30. The width (Wα) is measured along the inner layer 30 in the cross section of FIG. 1. A double-headed arrow (Wβ) indicates an axial direction width of the outer layer 32. The width (Wβ) is measured along the outer layer 32 in the cross section of FIG. 1. It is preferable that the width (Wα) be 0.9 or more times and 1.1 or less times the tread width. It is preferable that the width (Wβ) be 0.9 or more and 1.1 or less times the tread width.

Figure 2:
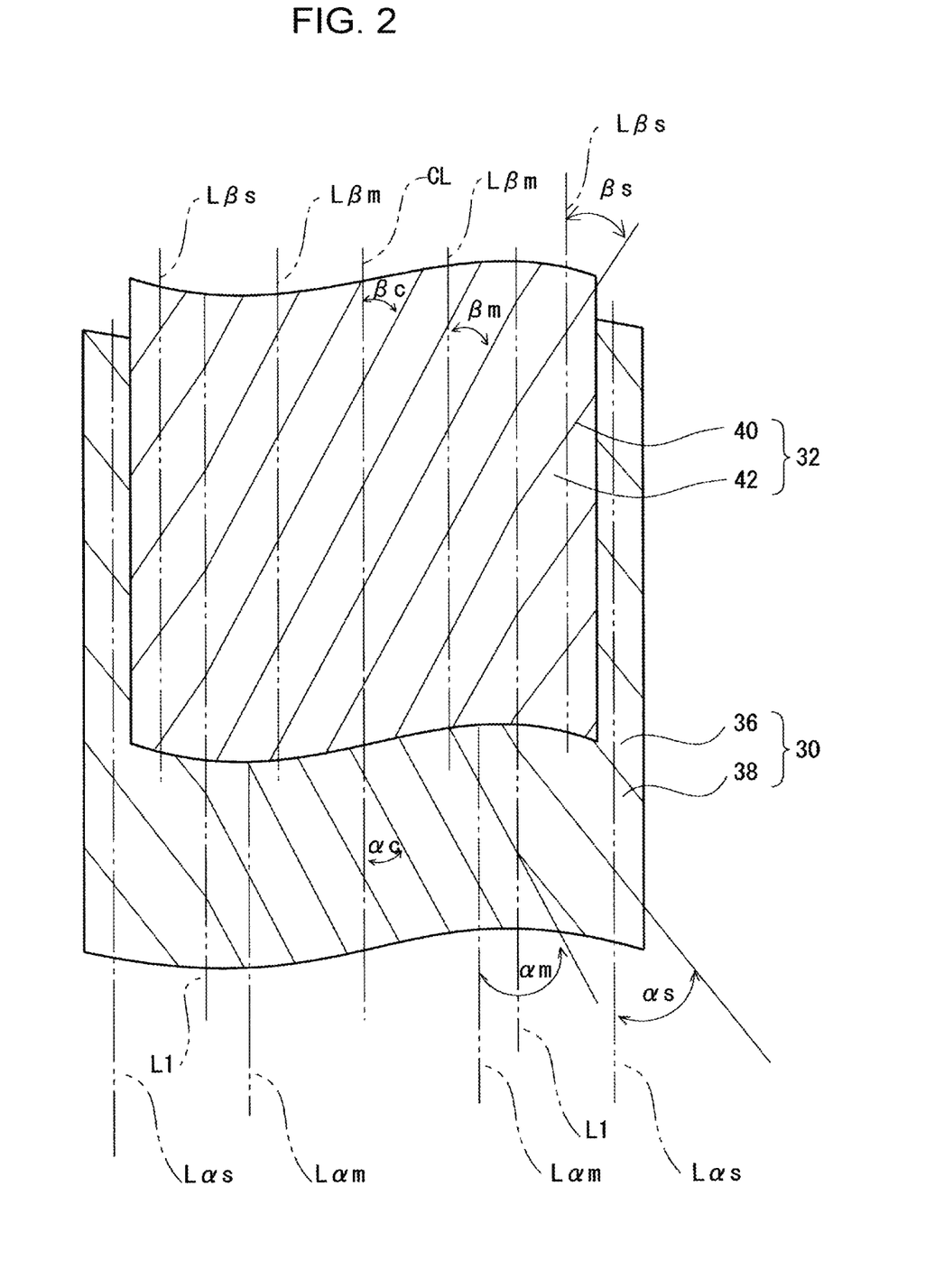
FIG. 2 is an explanatory diagram in which a portion of a belt of the tire of FIG. 1 is illustrated.

As illustrated in FIG. 2, the inner layer 30 is formed of a large number of parallel-aligned cords 36 and a topping rubber 38. The cords 36 of the inner layer 30 are inclined with respect to the equatorial plane (CL). The outer layer 32 is formed of a large number of parallel-aligned cords 40 and a topping rubber 42. An inclination direction of the cords 36 of the inner layer 30 and an inclination direction of the cords 40 of the outer layer 32 are opposite to each other with respect to the equatorial plane (CL). The cords 36 and the cords 40 cross each other and thereby a large reinforcing effect is obtained. A material of the cords 36 and the cords 40 is steel.

Two-dot chain lines (Lαs) in FIG. 2 indicate lines passing through positions of a width of 0.9 times the width (Wα) of the inner layer 30. The width from the line (Lαs) on one side in the axial direction to the line (Lαs) on the other side in the axial direction is 0.9 times the width (Wα). A two-dot chain line (Lαm) indicates a middle line between the equatorial plane and a line (Lαs). The middle line (Lαm) is positioned equidistant from the equatorial plane and the line (Lαs). Therefore, a width from the line (Lαm) on one side in the axial direction to the line (Lαm) on the other side in the axial direction is 0.45 times the width (Wα).

A double-headed arrow (αc) indicates an inclination angle of the cords 36 at the equatorial plane. The inclination angle (αc) is an intersection angle between the equatorial plane and the cords 36. The inclination angle (αc) has a maximum value of 90 degrees when the cords 36 are orthogonal to the equatorial plane and has a minimum value of 0 degree when the cords 36 are parallel to the equatorial plane. The inclination angle (αc) is, for example, 10 degrees or more and 35 degrees or less. A double-headed arrow (αs) indicates an inclination angle of the cords 36 at an edge portion of the inner layer. The inclination angle (αs) is an intersection angle between the line (Lαs) and the cords 36. The inclination angle (αs) has a maximum value of 90 degrees when the cords 36 are orthogonal to the line (Lαs) and has a minimum value of 0 degree when the cords 36 are parallel to the line (Lαs). A double-headed arrow (αm) indicates an inclination angle of the cords 36 at a middle portion between the equatorial plane and the edge portion. The inclination angle (αm) is an intersection angle between the line (Lαm) and the cords 36. The inclination angle (αm) has a maximum value of 90 degrees when the cords 36 are orthogonal to the line (Lαm) and has a minimum value of 0 degree when the cords 36 are parallel to the line (Lαm).

Two-dot chain lines (Lβs) indicate lines passing through positions of a width of 0.9 times the width (Wβ) of the outer layer 32. A two-dot chain line (Lβm) indicates a middle line between the equatorial plane and a line (Lβs). The middle line (Lβm) is positioned equidistant from the equatorial plane and the line (Lβs).

A double-headed arrow (βc) indicates an inclination angle of the cords 40 at the equatorial plane. The inclination angle (βc) is an intersection angle between the equatorial plane and the cords 40. The inclination angle (βc) has a maximum value of 90 degrees when the cords 40 are orthogonal to the equatorial plane and has a minimum value of 0 degree when the cords 40 are parallel to the equatorial plane. The inclination angle (βc) is, for example, 10 degrees or more and 35 degrees or less. A double-headed arrow (βs) indicates an inclination angle of the cords 40 at an edge portion of the outer layer. The inclination angle (βs) is an intersection angle between the line (Lβs) and the cords 40. The inclination angle (βs) has a maximum value of 90 degrees when the cords 40 are orthogonal to the line (Lβs) and has a minimum value of 0 degree when the cords 40 are parallel to the line (Lβs). A double-headed arrow (βm) indicates an inclination angle of the cords 40 at a middle portion between the equatorial plane and the edge portion. The inclination angle (βm) is an intersection angle between the line (Lβm) and the cords 40. The inclination angle (βm) has a maximum value of 90 degrees when the cords 40 are orthogonal to the line (Lβm) and has a minimum value of 0 degree when the cords 40 are parallel to the line (Lβm).

In the inner layer 30, the inclination angles of the cords 36 in the center region (C) and in the shoulder regions (S) are different from each other. The cords 36 are bent at the boundaries between the center region (C) and the shoulder regions (S). The inclination angle of the cords 36 in the shoulder regions (S) is larger than the inclination angle of the cords 36 in the center region (C). In the tire 2, the inclination angle (αc) and the inclination angle (αm) have the same value. The inclination angle (αs) is larger than the inclination angles (αc, αm). It is also possible that the inclination angle (αm) is larger than the inclination angle (αc). It is also possible that the inclination angle of the cords 36 is gradually increased from the equatorial plane toward the axial direction edges (30a).

In the outer layer 32, the inclination angles of the cords 40 in the center region (C) and in the shoulder regions (S) are different from each other. The cords 40 are bent at the boundaries between the center region (C) and the shoulder regions (S). The inclination angle of the cords 40 in the shoulder regions (S) is larger than the inclination angle of the cords 40 in the center region (C). The inclination angle (βc) and the inclination angle (βm) have the same value. The inclination angle (βs) is larger than the inclination angles (βc, βm). It is also possible that the inclination angle (βm) is larger than the inclination angle (βc). It is also possible that the inclination angle of the cords 40 is gradually increased from the equatorial plane toward the axial direction edges (32a).

As illustrated in FIG. 1, the band 14 is positioned on a radial direction outer side of the belt 12. In the axial direction, a width of the band 14 is larger than a width of the belt 12. The width of the band 14 is larger than the width (Wα) and the width (Wβ). Although not illustrated in the drawings, the band is formed of cords and a topping rubber. The cords are spirally wound. The band has a so-called jointless structure. The cords extend substantially in the circumferential direction. An angle of the cords with respect to the circumferential direction is 5 degrees or less, and further, 2 degrees or less. The belt 12 is restrained by the cords. Therefore, lifting of the belt 12 is suppressed. The cords are formed of organic fibers. The cords are formed of nylon fibers. Examples of other preferred organic fibers include polyester fibers, rayon fibers, polyethylene naphthalate fibers and aramid fibers.

The inner liner 16 is bonded to an inner peripheral surface of the carcass 10. The inner liner 16 is formed of a crosslinked rubber. A rubber excellent in air impermeability is used for the inner liner 16. The inner liner 16 plays a role in maintaining an inner pressure of the tire 2.

The chafer 18 is positioned in a vicinity of the bead 8. When the tire 2 is mounted to a rim, the chafer 18 is in contact with the rim. The chafer 18 is formed from a fabric and a rubber with which the fabric is impregnated. It is also possible to use a chafer 18 that is formed of a rubber alone.

A double-headed arrow (Tc) in FIG. 1 indicates a thickness of the tread 4 at the equatorial plane. A double-headed arrow (Ts) indicates a thickness of the tread 4 at an edge portion. The thickness (Ts) is measured at a position of the edge portion of the outer layer 32 in the axial direction. In other words, the thickness (Ts) is measured at the position of the width of 0.9 times the width (Wβ) of the outer layer 32. The thicknesses (Tc, Ts) are each measured as a distance from an outer surface of the belt 12 to the tread surface 20. In the tire 2, the thicknesses (Tc, Ts) are each measured as a distance from an outer surface of the outer layer 32 to the tread surface 20. The thicknesses (Tc, Ts) are each measured as a thickness in a direction perpendicular to the tread surface 20.

In the radial direction in each of the shoulder regions (S) of the tread 4, the side wall 6 and the carcass ply 28 extend inward in the radial direction. Therefore, when the tire 2 is filled with air, the tire 2 is more likely to expand in diameter in the center region (C) than in the shoulder regions (S). In the inner layer 30, the inclination angle (αs) is larger than the inclination angle (αc). In the outer layer 32, the inclination angle (βs) is larger than the inclination angle (βc). In the tire 2, due to the inner layer 30 and the outer layer 32, the shoulder regions (S) are more likely expand in diameter than the center region (C). In the tire 2, by expanding the shoulder regions (S) in diameter, expansion in diameter in the center region (C) is suppressed. In the tire 2, the entire tread 4 can uniformly expand in diameter. The expansion in diameter in the tread 4 is made uniform.

By increasing the difference (αs-αc) between the inclination angle (αs) and the inclination angle (αc), the shoulder regions (S) of the tread 4 are more likely to expand in diameter than the center region (C). From this point of view, the difference (αs-αc) between the inclination angle (αs) and the inclination angle (αc) is preferably 3 degrees or more. Similarly, the difference (βs-βc) between the inclination angle (βs) and the inclination angle (βc) is preferably 3 degrees or more. In the tire 2, the expansion in diameter in the tread 4 is made uniform. In the tire 2, uneven wear of the tread 4 is suppressed.

In the tire 2, the difference (αs-αc) between the inclination angle (αs) and the inclination angle (αc) is larger than the difference (βs-αc) between the inclination angle (βs) and the inclination angle (βc). The difference (αs-αc) in inclination angle in the inner layer 30 is larger than the difference (βs-βc) in inclination angle in the outer layer 32. The inner layer 30 is more likely to expand in diameter than the outer layer 32 in the shoulder regions (S).

The inner layer 30 is positioned on the carcass 10 side. By increasing the inclination angle (αs) of the inner layer 30, the inner layer 30 is likely to expand the carcass 10 in diameter in the shoulder region (S) and contributes to improvement in lateral rigidity of the carcass 10. The inner layer 30 contributes to the uniformization of expansion in diameter in the tread 4 and contributes to improvement in steering stability. On the other hand, the outer layer 32 on the tread 4 side suppresses the expansion in diameter in the shoulder regions (S). By combining the inner layer 30 and the outer layer 32, the entire tread 4 can uniformly expand in diameter. By expanding the entire tread 4 in diameter, the change in the outer diameter of the tire 2 can be reduced. When the tire 2 is filled with air, an appropriate ground contact shape is obtained. The tire 2 allows performances such as steering stability and riding comfort to be properly achieved.

In particular, in the tire 2 in which the cords of the carcass 10 are formed of organic fibers, due to the belt 12, the effect of uniformization of the expansion in diameter in the tread 4 is easily obtained. In the tire 2, the width (Wα) of the inner layer 30 is larger than the width (Wβ) of the outer layer 32 and thus, when the tire 2 is filled with air, the tire 2 is likely to properly expand in diameter.

In the tire 2 in which the inclination angles of the cords 36 and the cords 40 are too large, when the tire 2 is filled with air, the tire 2 is likely to expand in diameter. Further, in the tire 2, steering stability and riding comfort are also impaired. On the other hand, in the tire 2 in which the inclination angles are too small, steering stability and riding comfort are impaired. By properly setting the inclination angle (αm) of the cords 36 and the inclination angle (βm) of the cords 40 at the middle portion between the equatorial plane and the edge portion, the expansion in diameter of the tire 2 is suppressed, and the impairment in the steering stability and the riding comfort is suppressed. From this point of view, the inclination angles (αm, βm) are preferably 30 degrees or less. The inclination angles (αm, βm) are preferably 26 degrees or more.

In the tire 2, when the thickness (Ts) is larger than the thickness (Tc) in the tread 4, rigidity of the tread 4 becomes too large. In the tire 2, when the tire 2 is filled with air, proper expansion in diameter is hindered. From a point of view of allowing the tread 4 to properly expand in diameter, it is preferable that the thickness (Tc) be equal to or larger than the thickness (Ts). It is more preferable that the difference (Tc−Ts) between the thickness (Tc) and the thickness (Ts) be 0.1 mm or more. It is particularly preferable that the difference (Tc−Ts) between the thickness (Tc) and the thickness (Ts) be 0.2 mm or more. On the other hand, in the tire 2 in which the thickness (Tc) is larger than the thickness (Ts), when the tire 2 is filled with air, the center region (C) greatly expands in diameter. Uniform expansion in diameter in the tread 4 is unlikely to be obtained. From this viewpoint, the difference (Tc−Ts) is preferably 1.0 mm or less, and more preferably 0.5 mm or less.

The tire 2 has the band 14. The band 14 covers the entire outer surface of the belt 12. Band cords of the band 14 extend in the circumferential direction. The band 14 suppresses expansion in diameter in the entire belt 12. The band 14 contributes to the uniformization of the expansion in diameter in the tread 4. From a point of view of uniformizing the expansion in diameter in the tread 4, it is preferable to have the band 14.

Figure 3:
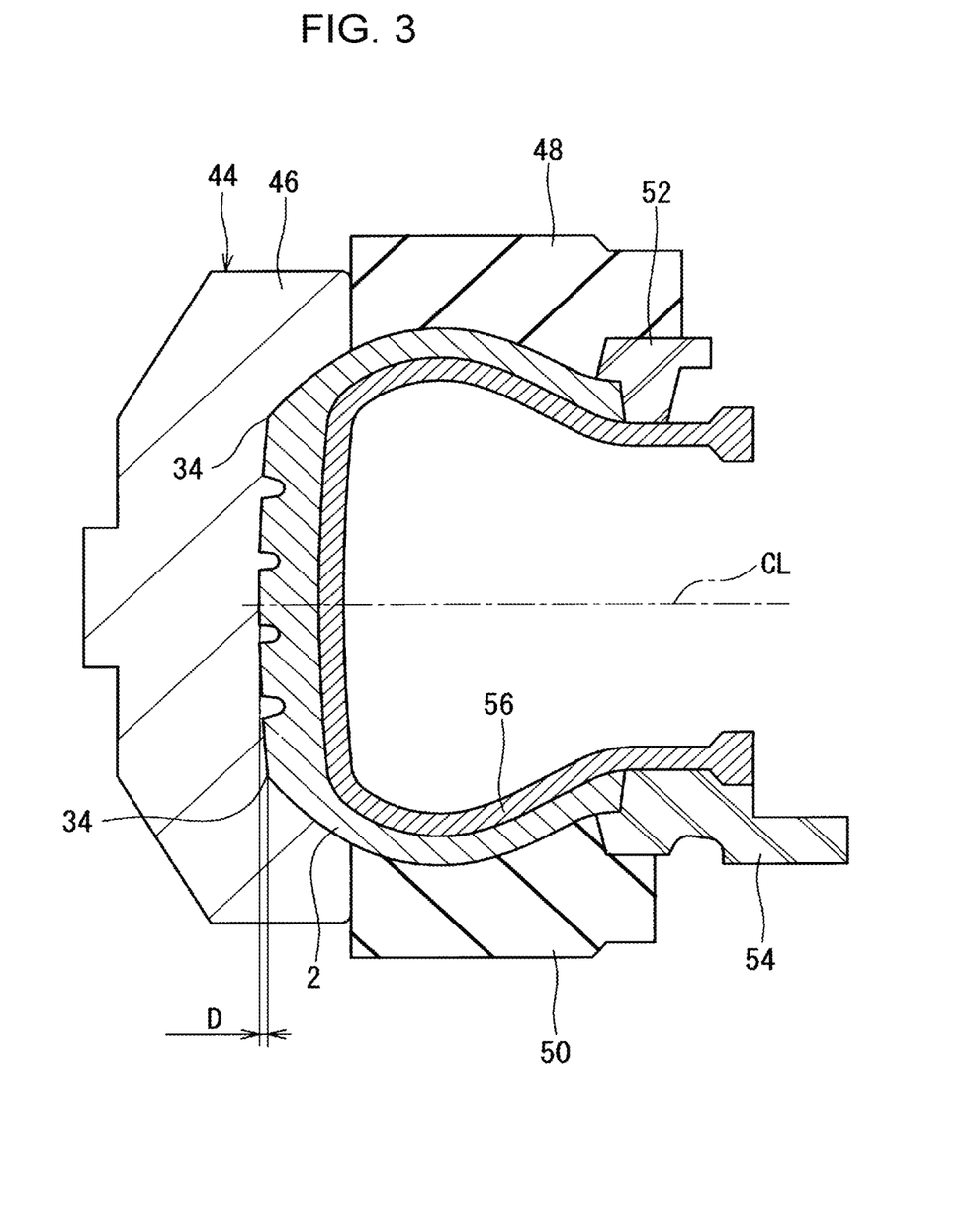
FIG. 3 is an explanatory diagram in which a cross section of a portion of a mold that is used in a method for manufacturing the tire of FIG. 1 is illustrated.

FIG. 3 illustrates a mold 44 that is used in a method for manufacturing the tire 2. The method for manufacturing the tire 2 includes a molding process and a vulcanization process. The mold 44 is used in the vulcanization process. The mold 44 includes a tread segment 46, an upper side plate 48, a lower side plate 50, an upper bead ring 52 and a lower bead ring 54. An outer surface of the tire 2 is molded by the tread segment 46, the upper side plate 48, the lower side plate 50, the upper bead ring 52 and the lower bead ring 54.

In the molding process, a raw cover (raw tire) is obtained by bonding members that form the tread 4, the side wall 6, the bead 8, the carcass 10, the belt 12, the band 14, the inner liner 16, the chafer 18 and the like. The member that forms the belt 12 includes an inner layer member that forms the inner layer 30 and an outer layer member that forms the outer layer 32.

In the vulcanization process, the raw cover is put in the mold 44. An internal pressure of a bladder 56 is increased. The raw cover is sandwiched by a cavity surface of the mold 44 and an outer surface of the bladder 56 and is pressed. The raw cover is heated by heat conducted from the mold 44 and the bladder 56. By the application of the pressure and the heat, a cross-linking reaction occurs in a rubber composition. By the vulcanization process, the raw cover is vulcanized and molded, and the tire 2 is obtained. A one-dot chain line (CL) in FIG. 3 denotes the equatorial plane of the tire 2.

A double-headed arrow (D) in FIG. 3 indicates a camber amount. The camber amount (D) is a height from an intersection point between the tread surface 20 and the equatorial plane to the tread edge 34. The camber amount (D) is a linear distance in the radial direction of the tire 2. In an embodiment of the present invention, the camber amount (D) is measured based on a shape of the mold 44. In the measurement of the camber amount (D), an intersection point between a molding surface that forms the tread surface 20 of the mold 44 and the equatorial plane corresponds to the intersection point between the tread surface 20 and the equatorial plane. An edge of the cavity surface that forms the tread surface 20 of the mold 44 corresponds to the tread edge 34. A radial direction of the mold 44 corresponds to the radial direction of the tire 2.

In the tire 2 in which the camber amount (D) is too small, the rigidity of the tread 4 is large. When the tire 2 is filled with air, uniform expansion in diameter in the tread 4 is suppressed. From a point of view of allowing the tread 4 to uniformly expand in diameter, the camber amount (D) is preferably 3 mm or more. On the other hand, in the tire 2 in which the camber amount (D) is too large, the rigidity of the shoulder regions (S) is reduced. When the tire 2 is filled with air, the center region (C) is likely to project. In the tire 2, uniform expansion in diameter in the tread 4 is suppressed. From the point of view of allowing the tread 4 to uniformly expand in diameter, the camber amount (D) is preferably 8 mm or less.

The inner layer member and the outer layer member are each formed of a large number of parallel-aligned steel cords and an unvulcanized topping rubber. In the molding process, the inner layer member and the outer layer member are bonded to an outer side of the member that formed the carcass 10. An inclination direction of the steel cords of the inner layer member and an inclination direction of the steel cords of the outer layer member are opposite to each other with respect to the equatorial plane. In the method for manufacturing the tire 2, on the equatorial plane, the inclination angle of the steel cords of the inner layer member and the inclination angle of the steel cords of the outer layer member have the same magnitude. As a result, at an edge portion, the inclination angle of the steel cords of the inner layer member is surely larger than the inclination angle of the steel cords of the outer layer member.

In an embodiment of the present invention, unless otherwise indicated, dimensions and angles of each of the members of the tire 2 are measured in a state in which the tire 2 is mounted to a normal rim and the tire 2 is filled with air such that the tire 2 has a normal internal pressure. During the measurement, a load is not applied to the tire 2. In the present specification, the term "normal rim" refers to a rim that is defined in the standards that the tire 2 relies on. A "Standard Rim" in the JATMA standards, a "Design Rim" in the TRA standards, and a "Measuring Rim" in the ETRTO standards are normal rims. In the present specification, the term "normal internal pressure" refers to an internal pressure that is defined in the standards that the tire 2 relies on. A "Highest Air Pressure" in the JATMA standards, a "Maximum Value" published in "Tire Load Limits at Various Cold Inflation Pressures" in the TRA standards, and an "Inflation Pressure" in the ETRTO standards are normal internal pressures.

EXAMPLES

In the following, the effect according to an embodiment of the present invention is revealed by examples. However, the present invention is not to be construed as being limited based on the description of the examples.

Example 1

A tire having the structure illustrated in FIG. 1 is obtained. The tire has a size of "215/45R17." The difference between the inclination angle ($\alpha c$) and the inclination angle ($\alpha s$) of the cords of the inner layer and the inclination angle ($\alpha m$) are set as illustrated in Table 1. The difference between the inclination angle ($\beta c$) and the inclination angle ($\beta s$) of the cords of the outer layer and the inclination angle ($\beta m$) are set as illustrated in Table 1. The width ($W\alpha$) of the inner layer is 200 mm and the difference between the width ($W\alpha$) and the width ($W\beta$) of the outer layer is set as illustrated in Table 1. The difference between the thickness (Tc) and the thickness (Ts) of the tread and the camber amount (D) are set as illustrated in Table 1.

Comparative Example 1

The inclination angles of the cords of the inner layer and the inclination angles of the cords of the outer layer are set as illustrated in Table 1. The camber amount (D) of the tread is set as illustrated in Table 1. Other structural components are the same as in Example 1, and a tire is obtained.

Example 2 and 3

The inclination angles of the cords of the inner layer and the inclination angles of the cords of the outer layer are set as illustrated in Table 1. The inclination angles of the cords are changed such that the inclination angle ($\alpha m$) of the inner layer and the inclination angle ($\beta m$) of the outer layer are as illustrated in Table 1. Other structural components are the same as in Example 1, and a tire is obtained.

Comparative Example 2

The difference between the inclination angle ($\alpha c$) and the inclination angle ($\alpha s$) of the cords of the inner layer and the difference between the inclination angle ($\beta c$) and the inclination angle ($\beta s$) of the cords of the outer layer are set as illustrated in Table 1. Other structural components are the same as in Example 1, and a tire is obtained.

Example 4 and 5

The difference between the thickness (Tc) and the thickness (Ts) of the tread is set as illustrated in Table 2. The difference between the inclination angle ($\alpha c$) and the inclination angle ($\alpha s$) of the cords of the inner layer and the difference between the inclination angle ($\beta c$) and the inclination angle ($\beta s$) of the cords of the outer layer are set as illustrated in Table 2. Other structural components are the same as in Example 1, and a tire is obtained.

Example 6

The camber amount (D) of the tread is set as illustrated in Table 1. The difference between the inclination angle ($\alpha c$) and the inclination angle ($\alpha s$) of the cords of the inner layer and the difference between the inclination angle ($\beta c$) and the inclination angle ($\beta s$) of the cords of the outer layer are set as illustrated in Table 2. Other structural components are the same as in Example 1, and a tire is obtained.

Example 7

The difference between the width ($W\alpha$) of the inner layer and the width ($W\beta$) of the outer layer is set as illustrated in Table 2. The difference between the inclination angle ($\alpha c$) and the inclination angle ($\alpha s$) of the cords of the inner layer and the difference between the inclination angle ($\beta c$) and the inclination angle ($\beta s$) of the cords of the outer layer are set as illustrated in Table 2. Other structural components are the same as in Example 1, and a tire is obtained.

Evaluation of Change in Outer Shape

For each of the tires of the example and the comparative examples, the outer diameter of the tire is measured in a state in which the tire is filled with air of a normal pressure. The outer diameter is measured on the equatorial plane. A difference between the outer diameter of the tire and an outer diameter of the tire measured by the mold is obtained. These results are listed in the following Table 1 and 2.

Steering Stability

Each of the tires is mounted to a normal rim and is filled with air at a normal internal pressured. The tire is mounted to a passenger car. The passenger car is driven by a driver and steering stability is evaluated. The results are listed in the following Table 1 and 2 as index numbers. The index number is a numerical number with a value of Comparative Example 1 as 100. A larger numerical number indicates a better steering stability.

Riding Comfort

Each of the tires is mounted to a normal rim and is filled with air at a normal internal pressured. The tire is mounted to a passenger car. The passenger car is driven to run and move over an outer peripheral surface of a semicircular column having a height of 50 mm. An impact force during the moving over is evaluated. The impact force is evaluated based on acceleration during the moving over. The results are listed in the following Table 1 and 2 as index numbers. The index number is a numerical number with a value of Comparative Example 1 as 100. A smaller numerical number indicates a better riding comfort.

TABLE 1

| | Evaluation Results | | | | |
|---|---|---|---|---|---|
| | Comparative Example 1 | Comparative Example 2 | Example 2 | Example 1 | Example 3 |
| Belt | | | | | |
| $\alpha s$-$\alpha c$ (degree) | 3 | 4 | 6 | 6 | 6 |
| $\beta s$-$\beta c$ (degree) | 3 | 4 | 4 | 4 | 4 |
| Difference (degree) | 0 | 0 | 2 | 2 | 2 |
| $\alpha m$ (degree) | 25 | 27 | 25 | 27 | 29 |
| $\beta m$ (degree) | 25 | 27 | 25 | 27 | 29 |
| $W\alpha$-$W\beta$ (mm) | 10 | 10 | 10 | 10 | 10 |

TABLE 1-continued

Evaluation Results

|  | Comparative Example 1 | Comparative Example 2 | Example 2 | Example 1 | Example 3 |
|---|---|---|---|---|---|
| Tread |  |  |  |  |  |
| Tc-Ts (mm) | 0.5 | 0.5 | 0.5 | 0.5 | 0.5 |
| Camber Amount D(mm) | 7 | 5 | 5 | 5 | 5 |
| Change in Outer Shape | 3 | 3.3 | 2.3 | 2.8 | 3 |
| Steering Stability | 100 | 105 | 115 | 120 | 115 |
| Riding Comfort | 100 | 95 | 90 | 85 | 80 |

TABLE 2

Evaluation Results

|  | Example 4 | Example 5 | Example 6 | Example 7 |
|---|---|---|---|---|
| Belt |  |  |  |  |
| $\alpha s-\alpha c$ (degree) | 7 | 5 | 5 | 6 |
| $\beta s-\beta c$ (degree) | 6 | 3 | 3 | 3 |
| Difference (degree) | 1 | 2 | 2 | 2 |
| $\alpha m$ (degree) | 27 | 27 | 27 | 27 |
| $\beta m$ (degree) | 27 | 27 | 27 | 27 |
| $W\alpha-W\beta$ (mm) | 10 | 10 | 10 | 5 |
| Tread |  |  |  |  |
| Tc-Ts (mm) | 0.3 | 0.8 | 0.5 | 0.5 |
| Camber Amount D (mm) | 5 | 5 | 7 | 5 |
| Change in Outer Shape | 2.7 | 3 | 3 | 2.9 |
| Steering Stability | 115 | 108 | 107 | 115 |
| Riding Comfort | 80 | 90 | 93 | 90 |

As illustrated in Table 1 and 2, in the tires of the examples, the change in the outer diameter is kept small. The tires of the examples are also superior in steering stability and riding comfort. From the results of the evaluation, the advantages according to an embodiment of the present invention are clear.

The above-described tire can be applied to pneumatic tires that are used in various vehicles.

In a tire described in Japanese Patent Laid-Open Publication No. 2000-309205, an inclination angle of carcass cords is set to a predetermined angle, and a surface shape of a tread par is formed to be approximately linear in a predetermined range. As a result, outer diameter expansion or outer diameter growth of the tire during running at a high speed is suppressed.

Japanese Patent Laid-Open Publication No. 2013-52756, Japanese Patent Laid-Open Publication No. H10-147110 and Japanese Patent Laid-Open Publication No. H1-101203 describe tires in which inclination angles of belt cords in a center region and in shoulder regions of a tread are different from each other. In these tires, due to the inclination angles of the belt cords, the tread has different rigidities in the center region and in the shoulder regions. In this way, by varying the rigidity of the tread, improvement in steering stability and riding comfort is achieved.

For these tires, further improvement in steering stability and riding comfort is demanded. Further, when a tire is filled with air, the tire expands due to an internal pressure. When a tire is filled with air, an outer diameter of the tire is changed. When the change in the outer diameter is large, the tire is unlikely to have a proper ground contact shape. Such a tire cannot sufficiently achieve performances such as steering stability and riding comfort. By reducing the change in the outer diameter, performances such as steering stability and riding comfort can be further improved.

A pneumatic tire according to an embodiment of the present invention allows a change in an outer diameter to be reduced and is superior in steering stability and riding comfort.

A pneumatic tire according to an embodiment of the present invention includes: a tread, an outer surface of which forms a tread surface; a carcass that is positioned on an inner side of the tread; and a belt that is laminated between the tread and the carcass in a radial direction. The belt includes an inner layer, and an outer layer that is laminated on a radial direction outer side of the inner layer. The inner layer and the outer layer are each formed of a large number of parallel-aligned steel cords and a topping rubber. The steel cords extend inclined with respect to an equatorial plane. An inclination direction of the steel cords of the inner layer and an inclination direction of the steel cords of the outer layer are opposite to each other with respect to the equatorial plane. An inclination angle ($\alpha s$) of the steel cords of the inner layer at an edge portion of the inner layer is larger than an inclination angle ($\alpha c$) of the steel cords of the inner layer at the equatorial plane. The edge portion of the inner layer is a position of 0.9 times an axial direction width of the inner layer. An inclination angle ($\beta s$) of the steel cords of the outer layer at an edge portion of the outer layer is larger than an inclination angle ($\beta c$) of the steel cords of the outer layer at the equatorial plane. The edge portion of the outer layer is a position of 0.9 times an axial direction width of the outer layer. A difference between the inclination angle ($\alpha s$) and the inclination angle ($\alpha c$) is larger than a difference between the inclination angle ($\beta s$) and the inclination angle ($\beta c$).

Preferably, the difference between the inclination angle ($\beta s$) and the inclination angle ($\beta c$) of the steel cords of the outer layer is 3 degrees or more.

Preferably, an inclination angle ($\alpha m$) of the steel cords of the inner layer at a middle portion between the equatorial plane and the edge portion is 26 degrees or more and 30 degrees or less. An inclination angle ($\beta m$) of the steel cords of the outer layer at a middle portion between the equatorial plane and the edge portion is 26 degrees or more and 30 degrees or less.

Preferably, the axial direction width of the inner layer is larger than the axial direction width of the outer layer.

Preferably, a thickness (Tc) of the tread at the equatorial plane is equal to or larger than a thickness (Ts) of the tread at the edge portion of the outer layer.

Preferably, a difference between the thickness (Tc) and the thickness (Ts) is 0.1 mm or more and 1.0 mm or less.

Preferably, the tire has a band. The band is formed of band cords that extend in a circumferential direction and a topping rubber. The band covers an outer surface of the belt.

Preferably, the carcass includes carcass cords and a topping rubber. The carcass cords are formed of organic fibers.

A method for manufacturing a pneumatic tire according to an embodiment of the present invention includes: a molding process in which a raw tire is formed from members that form parts of a tire, the members including a tread member that forms a tread, a carcass member that forms a carcass, and a belt member that forms a belt; and a vulcanization process in which the raw tire is vulcanized inside a mold.

In the molding process, the belt member is laminated between the member that forms the tread and the member that forms the carcass in the radial direction, and the belt member includes an inner layer member that forms an inner layer and an outer layer member that is superimposed on the inner layer member on a radial direction outer side, The inner layer member and the outer layer member are each formed of a large number of parallel-aligned steel cords and an unvulcanized topping rubber. The steel cords extend inclined with respect to an equatorial plane. An inclination direction of the steel cords of the inner layer member and an inclination direction of the steel cords of the outer layer member are opposite to each other with respect to the equatorial plane. An inclination angle of the steel cords of the outer layer member at an edge portion at a position of 0.9 times an axial direction width of the outer layer member is larger than an inclination angle of the steel cords of the outer layer member at the equatorial plane, An inclination angle of the steel cords of the inner layer member at an edge portion at a position of 0.9 times an axial direction width of the inner layer member is larger than an inclination angle of the steel cords of the inner layer member at the equatorial plane, The inclination angle of the steel cords at the edge portion of the inner layer member is larger than an inclination angle of the steel cords at the edge portion of the outer layer member.

In the manufacturing method, preferably, the inclination angle of the steel cords of the outer layer member at the equatorial plane and the inclination angle of the steel cords of the inner layer member at the equatorial plane have the same magnitude.

Preferably, a camber amount (D) of the tread of the mold is 3 mm or more and 8 mm of less.

In a pneumatic tire according to an embodiment of the present invention, the difference between the inclination angle ($\alpha$s) and the inclination angle ($\alpha$c) of the inner layer of the belt is larger than the difference between the inclination angle ($\beta$s) and the inclination angle ($\beta$c) of the outer layer of the belt. As a result, when the tire is filled with air, the difference in the expansion in diameter between the center region and the shoulder regions of the tread is reduced. In the tire, the entire tread uniformly expands in diameter and thus the change in the outer diameter of the tread is reduced. The tire allows an appropriate ground contact shape to be obtained, and is also superior in steering stability and riding comfort.

Obviously, numerous modifications and variations of the present invention are possible in light of the above teachings. It is therefore to be understood that within the scope of the appended claims, the invention may be practiced otherwise than as specifically described herein.

The invention claimed is:

1. A pneumatic tire, comprising:
a tread having an outer surface forming a tread surface;
a carcass positioned on an inner side of the tread; and
a belt laminated between the tread and the carcass in a radial direction,
wherein the belt includes an inner layer comprising a plurality of steel cords and a topping rubber, and an outer layer laminated on a radial direction outer side of the inner layer and comprising a plurality of steel cords and a topping rubber such that the steel cords in each of the inner and outer layers are parallel-aligned and extending inclined with respect to an equatorial plane and that an inclination direction of the steel cords in the inner layer and an inclination direction of the steel cords in the outer layer are opposite to each other with respect to the equatorial plane, and the belt is formed such that an inclination angle ($\alpha$s) of the steel cords in the inner layer at an edge portion of the inner layer is larger than an inclination angle ($\alpha$c) of the steel cords in the inner layer at the equatorial plane, that an inclination angle ($\alpha$m) of the steel cords in the inner layer at a middle portion between the equatorial plane and the edge portion is larger than the inclination angle ($\alpha$c) of the steel cords in the inner layer at the equatorial plane and is smaller than the inclination angle ($\alpha$s) of the steel cords in the inner layer at the edge portion. that the edge portion of the inner layer is at a position of 0.9 times an axial direction width of the inner layer, that an inclination angle ($\beta$s) of the steel cords in the outer layer at an edge portion of the outer layer is larger than an inclination angle ($\beta$c) of the steel cords in the outer layer at the equatorial plane, that the edge portion of the outer layer is at a position of 0.9 times an axial direction width of the outer layer, and that a difference between the inclination angle ($\alpha$s) and the inclination angle ($\alpha$c) is larger than a difference between the inclination angle ($\beta$s) and the inclination angle ($\beta$c).

2. The pneumatic tire according to claim 1, wherein the belt is formed such that the difference between the inclination angle ($\beta$s) and the inclination angle ($\beta$c) of the steel cords in the outer layer is 3 degrees or more.

3. The pneumatic tire according to claim 1, wherein the belt is formed such that the inclination angle ($\alpha$m) of the steel cords in the inner layer at the middle portion is in a range of 26 degrees or more and 30 degrees or less, and that an inclination angle ($\beta$m) of the steel cords in the outer layer at a middle portion between the equatorial plane and the edge portion is in a range of 26 degrees or more and 30 degrees or less.

4. The pneumatic tire according to claim 1, wherein the belt is formed such that the axial direction width of the inner layer is larger than the axial direction width of the outer layer.

5. The pneumatic tire according to claim 1, wherein the belt is formed such that a thickness (Tc) of the tread at the equatorial plane is equal to or larger than a thickness (Ts) of the tread at the edge portion of the outer layer.

6. The pneumatic tire according to claim 5, wherein the belt is formed such that a difference between the thickness (Tc) and the thickness (Ts) is in a range of 0.1 mm or more and 1.0 mm or less.

7. The pneumatic tire according to claim 1, further comprising:
a band comprising a plurality of band cords extending in a circumferential direction, and a topping rubber such that the band is covering an outer surface of the belt.

8. The pneumatic tire according to claim 1, wherein the carcass includes a plurality of carcass cords and a topping rubber, and the plurality of carcass cords comprises a plurality of organic fibers.

9. A method for manufacturing a pneumatic tire, comprising:
molding a raw tire comprising a tread member that forms a tread, a carcass member that forms a carcass, and a belt member that forms a belt; and
vulcanizing the raw tire inside a mold,
wherein the molding comprises laminating the belt member between the tread member and the carcass member in the radial direction, and the belt member comprises an inner layer member that forms an inner layer and an outer layer member that is superimposed on the inner layer member on a radial direction outer side, each of the inner layer member and the outer layer member comprises a plurality of steel cords and an unvulcanized topping rubber such that the steel cords in each of the inner layer and outer layer members are parallel-aligned extending inclined with respect to an equatorial plane, the belt member is formed such that an inclination direction of the steel cords in the inner layer member and an inclination direction of the steel cords in the outer layer member are opposite to each other with respect to the equatorial plane, that an inclination angle ($\alpha$s) of the steel cords in the inner layer at an edge portion of the inner layer is larger than an inclination angle ($\alpha$c) of the steel cords in the inner layer at the equatorial plane, that an inclination angle ($\alpha$m) of the steel cords in the inner layer at a middle portion between the equatorial plane and the edge portion is larger than the inclination angle ($\alpha$c) of the steel cords in the inner layer at the equatorial plane and is smaller than the inclination angle ($\alpha$s) of the steel cords in the inner layer at the edge portion. that the edge portion of the inner layer is at a position of 0.9 times an axial direction width of the inner layer, that an inclination angle ($\beta$s) of the steel cords in the outer layer at an edge portion of the outer layer is larger than an inclination angle ($\beta$c) of the steel cords in the outer layer at the equatorial plane, that the edge portion of the outer layer is at a position of 0.9 times an axial direction width of the outer layer, and that a difference between the inclination angle ($\alpha$s) and the inclination angle ($\alpha$c) is larger than a difference between the inclination angle ($\beta$s) and the inclination angle ($\beta$c).

10. The method according to claim 9, wherein the belt member is formed such that the inclination angle ($\beta$c) of the steel cords in the outer layer at the equatorial plane and the inclination angle ($\alpha$c) of the steel cords in the inner layer at the equatorial plane have the same magnitude.

11. The method according to claim 9, wherein the mold has a tread having a camber amount D in a range of 3 mm or more and 8 mm of less.

12. The pneumatic tire according to claim 1, wherein the belt is formed such that the inclination angle ($\alpha$m) of the steel cords in the inner layer at the middle portion is in a range of 26 degrees or more and 30 degrees or less.

13. The pneumatic tire according to claim 1, wherein the belt is formed such that an inclination angle ($\beta$m) of the steel cords in the outer layer at a middle portion between the equatorial plane and the edge portion is not equal to the inclination angle ($\beta$c) of the steel cords in the outer layer at the equatorial plane.

14. The pneumatic tire according to claim 13, wherein the belt is formed such that an inclination angle ($\beta$m) of the steel cords in the outer layer at a middle portion between the equatorial plane and the edge portion is greater than the inclination angle ($\beta$c) of the steel cords in the outer layer at the equatorial plane and is smaller than the inclination angle ($\beta$s) of the steel cords in the outer layer at the edge portion.

15. The pneumatic tire according to claim 13, wherein the belt is formed such that the inclination angle ($\beta$m) of the steel cords in the outer layer at the middle portion is in a range of 26 degrees or more and 30 degrees or less.

16. The pneumatic tire according to claim 12, wherein the belt is formed such that an inclination angle ($\beta$m) of the steel cords in the outer layer at a middle portion between the equatorial plane and the edge portion is greater than the inclination angle ($\beta$c) of the steel cords in the outer layer at the equatorial plane and is smaller than the inclination angle ($\beta$s) of the steel cords in the outer layer at the edge portion.

17. The pneumatic tire according to claim 1, wherein the belt is formed such that the inclination angle of the steel cords in the inner layer gradually increases from the equatorial plane toward an axial direction edge and that the inclination angle of the steel cords in the outer layer gradually increases from the equatorial plane toward an axial direction edge.

18. A pneumatic tire, comprising:
a tread having an outer surface forming a tread surface;
a carcass positioned on an inner side of the tread; and
a belt laminated between the tread and the carcass in a radial direction,
wherein the belt includes an inner layer comprising a plurality of steel cords and a topping rubber, and an outer layer laminated on a radial direction outer side of the inner layer and comprising a plurality of steel cords and a topping rubber such that the steel cords in each of the inner and outer layers are parallel-aligned and extending inclined with respect to an equatorial plane and that an inclination direction of the steel cords in the inner layer and an inclination direction of the steel cords in the outer layer are opposite to each other with respect to the equatorial plane, and the belt is formed such that an inclination angle ($\alpha$s) of the steel cords in the inner layer at an edge portion of the inner layer is larger than an inclination angle ($\alpha$c) of the steel cords in the inner layer at the equatorial plane, that an inclination angle ($\alpha$m) of the steel cords in the inner layer at a middle portion between the equatorial plane and the edge portion is larger than the inclination angle ($\alpha$c) of the steel cords in the inner layer at the equatorial plane and is smaller than the inclination angle ($\alpha$s) of the steel cords in the inner layer at the edge portion, that the edge portion of the inner layer is at a position of 0.9 times an axial direction width of the inner layer, that an inclination angle ($\beta$s) of the steel cords in the outer layer at an edge portion of the outer layer is larger than an inclination angle ($\beta$c) of the steel cords in the outer layer at the equatorial plane, that the edge portion of the outer layer is overlapping the edge portion of the inner layer, that the edge portion of the outer layer is at a position of 0.9 times an axial direction width of the outer layer, and that a difference between the inclination angle ($\alpha$s) and the inclination angle ($\alpha$c) is larger than a difference between the inclination angle ($\beta$s) and the inclination angle ($\beta$c).

19. The pneumatic tire according to claim 18, wherein the belt is formed such that a boundary between a shoulder region and a center region in the outer layer coincides with a boundary between a shoulder region and a center region in the inner layer and that the shoulder regions of the inner and outer layers form the edge portions of the inner and outer layers.

20. The pneumatic tire according to claim 18, wherein the belt is formed such that the inclination angle ($\alpha$m) of the steel cords in the inner layer at the middle portion is in a range of 26 degrees or more and 30 degrees or less, and that an inclination angle ($\beta$m) of the steel cords in the outer layer at a middle portion between the equatorial plane and the edge portion is in a range of 26 degrees or more and 30 degrees or less.

* * * * *